Figure 4:
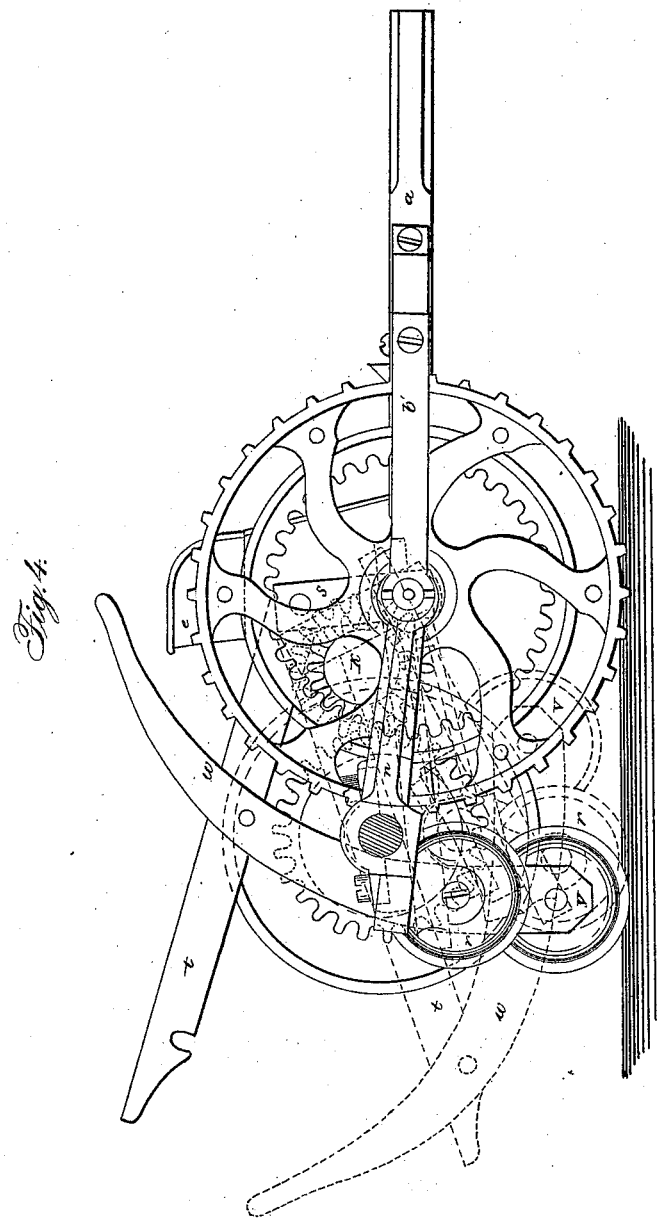

J. HOADLEY.
Steam-Plow.
No. 43,913.
3 Sheets—Sheet 1.
Patented Aug. 23, 1864.
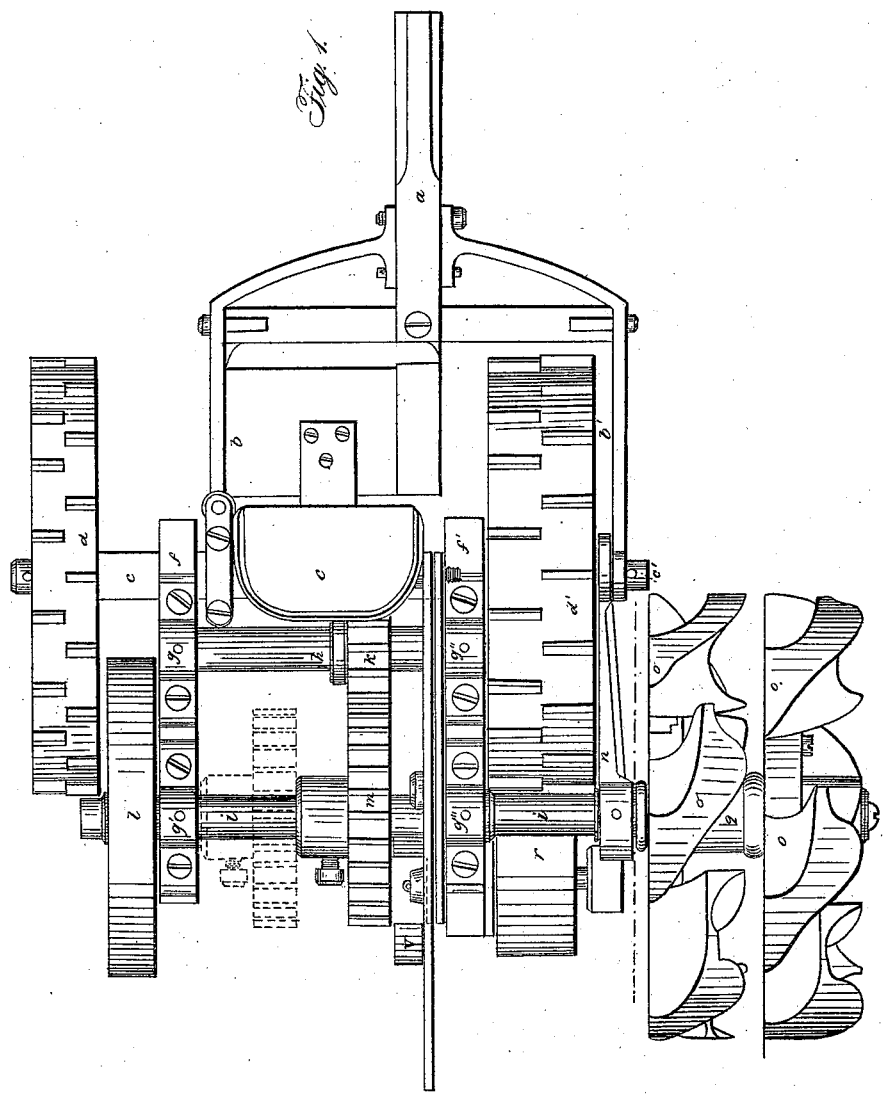

J. HOADLEY.
Steam-Plow.
No. 43,913.
3 Sheets—Sheet 2.
Patented Aug. 23, 1864.
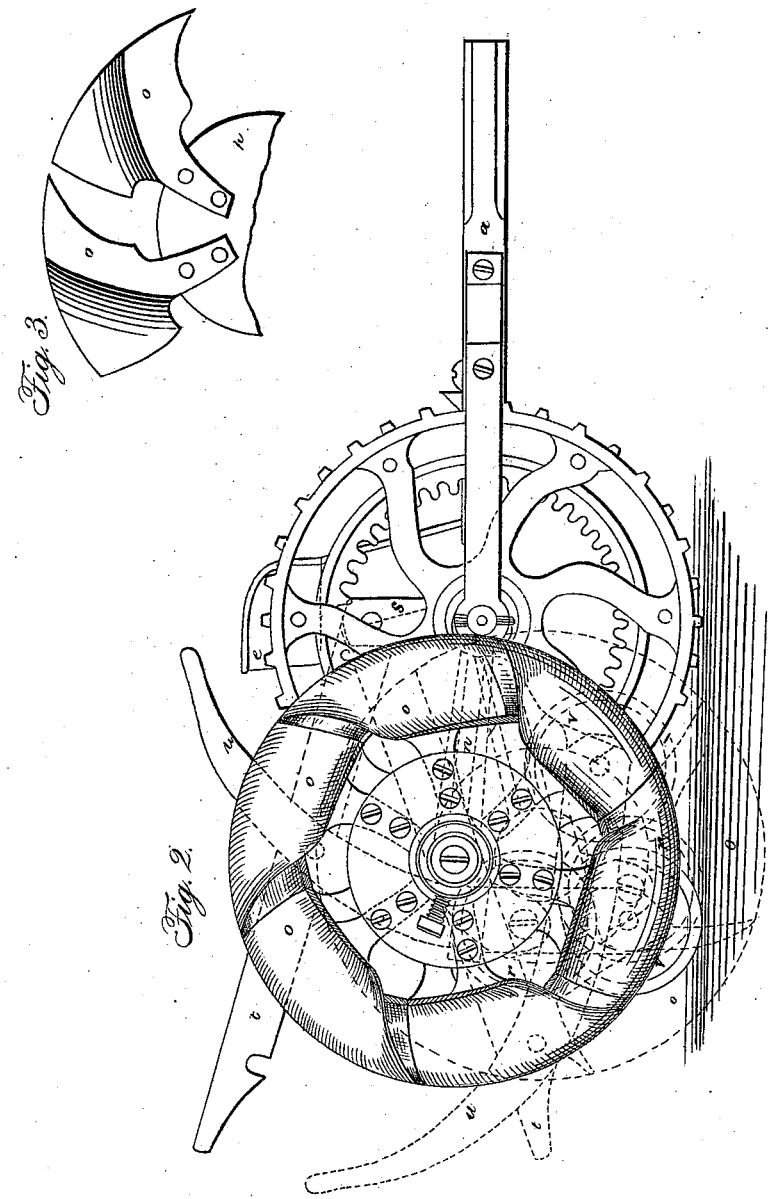
Witnesses:
Inventor:

J. HOADLEY.

Steam-Plow.

No. 43,913.

3 Sheets—Sheet 3.

Patented Aug. 23, 1864.

Witnesses:

Inventor:
John Hoadley
by Smith & King
Attorneys

UNITED STATES PATENT OFFICE.

JOHN HOADLEY, OF ZANESVILLE, OHIO.

ROTATING PLOW.

Specification forming part of Letters Patent No. 43,913, dated August 23, 1864.

*To all whom it may concern:*

Be it known that I, JOHN HOADLEY, of Zanesville, in the county of Muskingum, in the State of Ohio, have invented certain new and useful Improvements in Plowing-Machines; and I do hereby declare that the following is a full and exact description thereof, reference being had to the accompanying drawings, forming a part of this specification, and to the letters of reference marked thereon.

In the drawings hereto attached, Plate I, Figure I is a plan view of the machine. Plate II, Fig. I is an elevation. Plate II, Fig. II is a side view of two of the plows, showing their relative position and mode of attachment. Plate III, Fig. IV is an elevation or side view, with the plows detached, to show more distinctly the machinery.

In all these figures the same letters refer to the same parts.

To enable others skilled in the arts to make and use my invention, I will proceed to describe its construcion and operation.

This machine belongs to that class known as "rotary plows," and may be operated or moved by steam, horse, or any other power. The plows are attached in one, two, three, or more gangs to a common shaft, with which they revolve.

The following is a particular description of the several parts of the machine.

$a$ is the tongue, to which the motive power is attached; $b\ b'$, braces connecting the tongue to the axle $c\ c'$ of the walking-wheels $d\ d'$.

$e$ is the driver's seat.

$f\ f'$ are two arms, permanently attached to the axle by welding, bolting, or otherwise. On each of these arms are affixed two boxes, $g\ g'$ and $g''\ g'''$, for the journals for the first driving-shaft, $h$, and plow-shaft $i\ i$. On the driving-shaft, permanently attached to it, are two cog-wheels or pinions, one of which, $k$, is seen in Fig. I, Plate I, the other, $k'$, in Fig. IV, Plate III. The pinion $k'$ cannot be seen on Plate I, Fig. I, because it works into a cog-wheel within the walking-wheel $d'$. The shaft $i$ may be called the "plow-shaft," and works in boxes $g'\ g'''$, and carries on its end, outside of box $g'$, a guide-wheel, $l$. Between the boxes $g'$ and $g'''$ it carries a cog-wheel, $m$, that works into pinion or small cog wheel $k$ on shaft $h$. This cog-wheel $m$ is affixed to the shaft $i$ by means of a permanent key and screw, which allow it to be loosened when necessary to throw it out of gear, when it will occupy the position shown in red line. This shaft, after passing the face of the walking-wheel $d'$, passes through a brace extending back from the axle, and is designated by letter $n$, and immediately outside of this brace it carries the gang or gangs of plows $o\ o$. These gangs of plows are each attached to a center plate or flange, a portion of one of which is seen at $p$ in Fig. III, Plate II, having on its outer face a deep boss, $q\ q$, with a slot or groove entirely through it, to fit upon a permanent key on the plow-shaft $i\ i$. By means of this slot and key and a set-screw passing through the boss $q$ each gang or set of plows is fixed permanently and in their proper position upon the plow-shaft.

Between the posterior extremity of the arm $f'$ and the brace $n$ is the guide-wheel $r$, attached to the said arm and brace by brackets, and through the wheel and brackets there is an axle, $r'$, on which the wheel revolves. When the plows are at work in the ground this wheel descends to the surface of the ground immediately in the track of the main walking-wheel $d'$, supporting the plow-shaft $i$ and regulating the depth of the furrow. When the plows are not at work this wheel and the plows are to be, or can be, elevated by means of an arrangement I have yet to describe.

Attached permanently to the axle $c\ c'$ there is an ascending bracket, $s$, to which is jointed a notched arm, $t$. Lever $u$ is movable upon an axis permanently attached to arm $f'$ near its posterior extremity, and has at its shorter and lower extremity an arrangement for supporting and operating the wheel $v$. The arm $t$ has two or more notches on its lower edge falling into a stud on the side of lever $u$. The object of this arrangement is to elevate or depress the plows, so that after the machine has performed its functions in plowing by means of the lever $u$ the wheel $v$ can be thrown down so as to elevate the plows entirely above the surface, and thus in this condition allow the machine to be transported upon its own wheels $d$ and $d'$, as any ordinary wheeled vehicle. In Fig. II, Plate II, and Fig. IV, Plate III, the black lines of $t$ and $u$ show their position when the plows are raised up, and the red lines of the same show the position these part assume when the plows are let down to perform their duty in plowing.

The main driving-wheel of all this machinery is the walking-wheel $d'$. In the interior of this wheel, as will be seen in Fig. II, Plate II, and Fig. IV, Plate III, there is a cog-wheel with its cogs on the inner surface and permanently attached to the arms of the walking-wheel. These cogs gear into those on pinion $k'$, which is permanently fixed to the shaft, and thus through pinion $k$ and cog-wheel $m$ gives motion to the plows and other parts of the machinery connected therewith.

The form of the plow that I prefer very nearly resembles that of the best instruments of the kind now in use, except that the bottom has a curve modified to suit the radius of the circle formed by these points and the progress of the forward motion of the machine. As these plows enter the ground in the line of progress—that is, from behind forward—by a proper adjustment of the plow in each gang the several furrows they cut will be level at the bottom, or nearly so, and after the first revolution each plow will begin to enter the solid ground only when it has reached to or very near the bottom of the furrow. In the operation, the outer gang, taking the lead, throws its furrow-slice out, leaving an open furrow, into which the next gang throws its slice, and this operation leaving another open for the reception of the next gang. From mechanical principles it necessarily follows that the furrow-slice of each plow will not, as at first thought would be supposed, have its under face formed very nearly as the arc of a circle, but rather the arc or curve of an elongated ellipsis, as a consequence of their compound rotary and progressive motion.

The depth of the furrow is to be governed by the diameter of the wheels $r$ and $l$, which are consequently so arranged in the machine that one set of a required diameter can be easily substituted for another no longer desired.

Having thus fully set forth the construction and mode of operation of my invention, what I claim therein, and desire to secure by Letters Patent of the United States, is the following:

1. In combination with the shaft $i$ and guide-wheel $r$, the arm $t$, lever $u$, and wheel $v$, for elevating, lowering, and regulating the depth of the furrow, when constructed in the manner as and for the purpose set forth.

2. The guide-wheel $r$, when arranged in the manner set forth for supporting the plow when operating or plowing.

3. The combination of the wheels $r$ and $l$, arranged and operating substantially as set forth, for regulating the depth of the furrow.

4. The brace $n$, connecting the axle $c\ c'$ of the walking-wheels with the plow-shaft $i\ i$ and supporting the latter outside of the walking-wheel $d'$.

5. The use of rotating plows attached to the shaft outside the walking-wheel, when said shaft is supported by a brace or other equivalent device attached to the outer end of the axle of the walking-wheel.

JOHN HOADLEY.

Witnesses:
GILBERT B. TOWLES,
T. R. DAVIS,
S. P. SLEPPY.